US009135699B2

(12) United States Patent
Ralovich et al.

(10) Patent No.: US 9,135,699 B2
(45) Date of Patent: Sep. 15, 2015

(54) METHOD AND SYSTEM FOR HEMODYNAMIC ASSESSMENT OF AORTIC COARCTATION FROM MEDICAL IMAGE DATA

(71) Applicants: Kristof Ralovich, Munich (DE); Lucian Mihai Itu, Brasov (RO); Viorel Mihalef, Keasbey, NJ (US); Puneet Sharma, Monmouth Junction, NJ (US); Razvan Ioan Ionasec, Princeton, NJ (US); Dime Vitanovski, Erlangen (DE); Waldemar Krawtschuk, Erlangen (DE); Dorin Comaniciu, Princeton Junction, NJ (US)

(72) Inventors: Kristof Ralovich, Munich (DE); Lucian Mihai Itu, Brasov (RO); Viorel Mihalef, Keasbey, NJ (US); Puneet Sharma, Monmouth Junction, NJ (US); Razvan Ioan Ionasec, Princeton, NJ (US); Dime Vitanovski, Erlangen (DE); Waldemar Krawtschuk, Erlangen (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 315 days.

(21) Appl. No.: 13/826,307

(22) Filed: Mar. 14, 2013

(65) Prior Publication Data
US 2013/0243294 A1    Sep. 19, 2013

Related U.S. Application Data

(60) Provisional application No. 61/611,057, filed on Mar. 15, 2012.

(51) Int. Cl.
G06K 9/00 (2006.01)
G06T 7/00 (2006.01)

(52) U.S. Cl.
CPC ..... *G06T 7/0012* (2013.01); *G06T 2207/10076* (2013.01); *G06T 2207/10096* (2013.01); *G06T 2207/30104* (2013.01)

(58) Field of Classification Search
None
See application file for complete search history.

(56) References Cited

U.S. PATENT DOCUMENTS

| 5,150,292 A | * | 9/1992 | Hoffmann et al. ............ 600/431 |
| 5,579,767 A | * | 12/1996 | Prince ............................ 600/420 |
| 5,953,444 A | * | 9/1999 | Joseph et al. ................. 382/131 |
| 7,860,290 B2 | | 12/2010 | Gulsun et al. |
| 7,953,266 B2 | | 5/2011 | Gulsun et al. |
| 8,098,918 B2 | | 1/2012 | Zheng et al. |
| 8,386,188 B2 | | 2/2013 | Taylor et al. |

(Continued)

OTHER PUBLICATIONS

"Effects of exercise and respiration on hemodynamic efficiency in cfd simulations of the total cavopulmonary connection," Marsden A. L., et al, Annals of Biomedical Engineering, vol. 35, No. 2, Feb. 2007, pp. 250-263.*

(Continued)

*Primary Examiner* — Wenpeng Chen

(57) ABSTRACT

A method and system for non-invasive hemodynamic assessment of aortic coarctation from medical image data, such as magnetic resonance imaging (MRI) data is disclosed. Patient-specific lumen anatomy of the aorta and supra-aortic arteries is estimated from medical image data of a patient, such as contrast enhanced MRI. Patient-specific aortic blood flow rates are estimated from the medical image data of the patient, such as velocity encoded phase-contrasted MRI cine images. Patient-specific inlet and outlet boundary conditions for a computational model of aortic blood flow are calculated based on the patient-specific lumen anatomy, the patient-specific aortic blood flow rates, and non-invasive clinical measurements of the patient. Aortic blood flow and pressure are computed over the patient-specific lumen anatomy using the computational model of aortic blood flow and the patient-specific inlet and outlet boundary conditions.

29 Claims, 8 Drawing Sheets

(56) References Cited

U.S. PATENT DOCUMENTS

| | | | |
|---|---|---|---|
| 2003/0114756 A1* | 6/2003 | Li | 600/437 |
| 2007/0297561 A1* | 12/2007 | Breeuwer et al. | 378/4 |
| 2010/0067760 A1 | 3/2010 | Zhang et al. | |
| 2010/0074494 A1* | 3/2010 | Karmonik et al. | 382/131 |
| 2010/0239148 A1 | 9/2010 | Zheng et al. | |
| 2010/0241404 A1* | 9/2010 | Taylor et al. | 703/1 |
| 2010/0308823 A1* | 12/2010 | Sugiura | 324/309 |
| 2011/0224542 A1 | 9/2011 | Mittal et al. | |
| 2012/0022843 A1* | 1/2012 | Ionasec et al. | 703/9 |
| 2012/0041301 A1 | 2/2012 | Redel | |
| 2012/0041318 A1* | 2/2012 | Taylor | 600/504 |
| 2012/0041739 A1* | 2/2012 | Taylor | 703/11 |
| 2012/0072190 A1 | 3/2012 | Sharma et al. | |
| 2012/0076380 A1* | 3/2012 | Guhring et al. | 382/131 |
| 2012/0121151 A1 | 5/2012 | Bernhardt et al. | |
| 2012/0203530 A1 | 8/2012 | Sharma et al. | |
| 2013/0197881 A1* | 8/2013 | Mansi et al. | 703/2 |

OTHER PUBLICATIONS

"A software framework for creating patient specific geometric models from medical imaging data for simulation based medical planning of vascular surgery," Wilson, N. M. et al, Lecture Notes in Computer Science 2001; LNCS 2208, p. 449-456.*

Olufsen et al., "Numerical Simulation and Experimental Validation of Blood Flow in Arteries with Structure-Tree Outflow Conditions", Annals of Biomedical Engineering, vol. 28, pp. 1281-1299, 2000.

Stergiopulos et al., "Total Arterial Inertance as the Fourth Element of the Windkessel Model", Am. J. Physiol., H81-H88, 1999.

* cited by examiner

Fusion of anatomic and flow MR images

Image segmentation: Vessel wall extraction

Extraction of 3D surface mesh and inflow flow profile

Construction of 1-d model: Centerline and cross-section extraction

METHOD AND SYSTEM FOR HEMODYNAMIC ASSESSMENT OF AORTIC COARCTATION FROM MEDICAL IMAGE DATA

This application claims the benefit of U.S. Provisional Application No. 61/611,057, filed Mar. 15, 2012, the disclosure of which is herein incorporated by reference.

BACKGROUND OF THE INVENTION

The present invention relates to assessment of aortic coarctation from medical image data, and more particularly, to non-invasive hemodynamic assessment of aortic coarctation by computing blood pressure in the aorta based on patient-specific anatomy and blood flood estimated from medical image data.

Coarctation of the aorta (CoA) is a congenital defect characterized by a sever narrowing of the aorta, usually distal to the aortic arch. Congenital heart disease occurs in approximately eight out of every one thousand live births in the United States, and CoA patients account for approximately 5-8% perfect of those live births with congenital heart disease. Patients born with CoA depend on care through their lives and typically require risky and expensive operations, such as surgical repair or interventional procedures like stent implantation or balloon angioplasty.

For pre-operative evaluation of the severity of CoA in a patient, pressure gradients are typically used. These gradients can be estimated from pressures measured in the arms, leg, or other extremities, but the current clinical gold-standard is obtained by invasive cardiac catheterization to measure the pressure drop across the coarctation site. However, a non-invasive technique for accurately measuring the pressure drop across the coarctation site to determine the severity of COA is desirable.

BRIEF SUMMARY OF THE INVENTION

The present invention provides a method and system for non-invasive hemodynamic assessment of aortic coarctation using medical image data. Embodiments of the present invention provide a methodology to estimate the pressure distribution in blood vessels or the aorta by numerical modeling of the pressure-flow relationship with patient-specific parameters and blood flow estimated from medical imaging data. Embodiments of the present invention utilize an image-based pre-processing and hemodynamics simulation pipeline for thoracic aortic investigation. A patient-specific model of the aorta and supra-aortic arteries is automatically estimated using a discriminative learning based method. Based on the lumen geometry, a computational fluid dynamics (CFD) simulation employing personalized boundary conditions provides dense 3D+time velocity and pressure maps, which can be used to calculate a pressure drop over the aortic coarctation site.

In one embodiment of the present invention, patient-specific lumen anatomy of the aorta and supra-aortic arteries is estimated from medical image data of a patient. Patient-specific aortic blood flow rates are estimated from the medical image data of the patient. Patient-specific inlet and outlet boundary conditions for a computational model of aortic blood flow are calculated based on the patient-specific lumen anatomy, the patient-specific aortic blood flow rates, and non-invasive clinical measurements of the patient. Aortic blood flow and pressure are simulated over the patient-specific lumen anatomy using the computational model of aortic blood flow and the patient-specific inlet and outlet boundary conditions.

These and other advantages of the invention will be apparent to those of ordinary skill in the art by reference to the following detailed description and the accompanying drawings.

DETAILED DESCRIPTION

Figure 1:
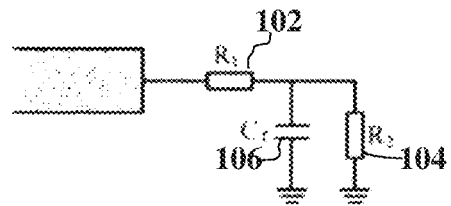
FIG. 1 illustrates the Windkessel boundary condition.

The present invention generally relates to a method and system for non-invasive estimation of pressure distributions in vessels, and more particularly to non-invasive hemodynamic assessment of aortic coarctation from medical image data, such as magnetic resonance (MR) data. Embodiments of the present invention are described herein to give a visual understanding of the methods for simulating blood flow and pressure and assessing aortic coarctation. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention provide a computational framework to determine patient-specific time varying pressure distributions along vessel centerlines extracted from medical image data, such as 4D phase contrast MRI data. According to an embodiment of the present invention, a patient-specific vessel centerline tree and corresponding time-varying cross-section area information are extracted from medical imaging data, and time-varying inflow and outflow rates are extracted from phase contrast data. Patient-specific axially varying elasticity parameters for the vessel wall are estimated by matching the observed and simulated deformation of the vessel wall. Impedance values representing the downstream vasculature are estimated by tuning structured-tree outlet boundary conditions tuned to fie the phase-contrast outflow rates at each outlet. Blood flow and pressure are simulated by solving unsteady axi-symmetric 1D Navier Stokes equations with elastic walls with patient-specific boundary conditions and parameters in order to determine the pressure distribution along the centerline tree. This computational framework can be applied to various types of large and small vessels, such as the aorta, coronary arteries, renal artery, iliac artery, etc.

Numerical methods used to model blood flow and vessel deformation inside the cardiovascular system can be generally divided into three main types: closed-loop lumped parameter models, one-dimensional pulse propagation models, and three-dimensional computational fluid dynamics (CFD) and fluid structure interaction (FSI) models. One-dimensional models of the complete arterial tree or part of the arterial tree may be used to study pressure and flow wave propagation phenomena through the arterial system since the one-dimensional equations are hyperbolic and model wave propagation aspects. An advantage of one-dimensional blood flow models is that the execution time is several orders of magnitude smaller than for three-dimensional models. Since the cardiovascular system includes millions of blood vessels, even a fast one-dimensional approach may not be feasible for the whole system. Hence, the arterial tree can be truncated and outflow boundary conditions can be specified. One-dimensional blood flow models can also be used to determine proper outflow boundary conditions for three-dimensional blood flow models.

One-dimensional models are described through a set of two hyperbolic quasilinear partial differential equations and a state equation which describe the compliance of the arterial wall. The two partial differential equations are derive from Navier-Stokes equations by introducing a series of simplifying assumptions: axial symmetry; the wall displaces only along the radial direction; the cylinder axis is fixed in space and time; the pressure is constant on each axial section; no body forces are considered; and the velocity components orthogonal to the z axis are neglected. Accordingly, the following set of equations can be obtained in non-dimensional form:

$$\frac{\partial A}{\partial t} + \frac{\partial q}{\partial x} = 0 \qquad (1)$$

$$\frac{\partial q}{\partial t} + \frac{\partial}{\partial x}\left(2\pi \int_0^R u_x^2 r\, dr\right) + \frac{A}{\rho}\frac{\partial p}{\partial x} = 2\pi\upsilon\left[r\frac{\partial u_x}{\partial r}\right]_R, \qquad (2)$$

where A, q, and p are dependent variables representing area, flow, and pressure, respectively, r is the vessel radius, $\rho$ is the fluid density, $\upsilon$ is the fluid viscosity, u is the velocity vector, $\delta$ is the thickness of the boundary, Re is the Reynolds number. The first equation represents the continuity equation, while the second equation represents the momentum equations in the longitudinal direction. The second term in Equation (2) represents the convective acceleration and depends on the velocity profile supposed for the simulation. The term can be evaluated to the expression $\alpha q^2/A$, where $\alpha$ is a coefficient depending on the shape of the velocity profile. The term on the right hand side of Equation (2) represents the viscous losses and depends again on the velocity profile.

As for the state equation, there are various possibilities, from simple algebraic equations to more complex differential equations that also consider visco-elastic effects. The general form of the state equations can be expressed as:

$$p(x,t) - p_0 = \psi(A(x,t), A_0, f) + \gamma\frac{\partial A}{\partial t}, \qquad (3)$$

where p(x,t) is the pressure at each grid point x at each moment in time t, $p_0$ is the external pressure, $A_0$ is the initial cross-sectional area corresponding to $p_0$, f represents the stiffness of the vessel (depends on the Young modulus, wall thickness, and initial radius), and $\gamma$ is a visco-elastic coefficient. Regarding a numerical solution to the above set of equations, there are several possibilities including the finite difference method and finite element methods, such as the two-step Lax-Wendroff method, the method of characteristics, and the Taylor-Glerkin scheme.

One aspect in the application of the one-dimensional model to arterial trees is the treatment of bifurcations, where one parent vessel splits into two daughter vessels. In order to solve equations at a bifurcation point, two additional conditions are introduced: continuity of flow rate and continuity of pressure. There are different possibilities for applying the pressure continuity. For example, one can consider static pressure, dynamic pressure, or different pressure loss terms can be introduced for each daughter vessel in order to account for energy losses which can appear, especially at bifurcations of large vessels. The final choice can depend on the size of the vessels, the bifurcation angles, and the location of the bifurcation.

Another aspect to provide for correct evaluation of the patient-specific time varying pressure distribution long vessel centerlines is the treatment of the outflow boundary conditions. According to various implementations, three main types of boundary conditions can be used for one-dimensional blood flow simulations. A first type of outflow boundary condition is the resistance boundary condition, which considers a flow rate proportional to the pressure. The resistance boundary condition can be expressed as:

$$p = q \cdot R. \qquad (4)$$

The drawbacks of the resistance boundary condition is that it is difficult to choose the correct value for the peripheral resistance, and the pressure and the flow are forced to be in phase.

A second type of outflow boundary condition is the Windkessel boundary condition. FIG. 1 illustrates the Windkessel boundary condition. As illustrated in FIG. 1, the Windkessel boundary condition is a three-element model that includes two resistances ($R_1$ and $R_2$) 102 and 104, and a compliance ($C_T$) 106. The Windkessel model can be expressed as:

$$\frac{\partial p}{\partial t} = R_1\frac{\partial q}{\partial t} - \frac{p}{R_2 C_T} + \frac{q(R_1 + R_2)}{R_2 C_T}. \qquad (5)$$

The total resistance is equal to the value chosen for the resistance boundary condition and the ratio $R_1/R_2$ is usually taken to reduce reflections (the value of $R_1$ may be close to the value of the characteristic resistance for the vessel). Such a model allows for a phase lag between pressure and flow rate and is much closer to physiological data, but it does not include the wave propagation effects in the part of the arterial system that it models. The difficulty with the Windkessel boundary condition lies with choosing adequate values for the resistances and the compliance.

A third type of outflow boundary condition is the structured tree outflow boundary condition. This condition is derived by considering the vascular tree lying downwards from the outflow point as a structured binary tree. This type of boundary condition models the wave propagation effects in the smaller arteries. The structured tree boundary condition is based on an analytical solution of the linearized version of the 1D equations. This results in a root impedance being determined for the outflow point of each artery modeled in the one-dimensional tree. Since the analytical solution is performed in the frequency domain, the following relationship is imposed at the outflow point:

$$P(x,\omega)=Z(x,\omega)Q(x,\omega), \quad (6)$$

where P and Q are the pressure and the flow rate, respectively, at the outflow point and Z is the impedance value. Since Equations (1)-(3) are solved in the time domain, Equation (6) can be written in the time domain, thus resulting in the following convolution integral:

$$p(x,t) = \int_{t-T}^{t} q(x,\tau)z(x,t-\tau)d\tau. \quad (7)$$

The usage of the structured tree boundary condition leads to a higher computational intensity at the outflow points, but there are important physiological advantages to this type of modeling. Further, only one parameter has to be estimated for the structured tree, namely the minimum radius at which the structured tree ends.

Figure 2:
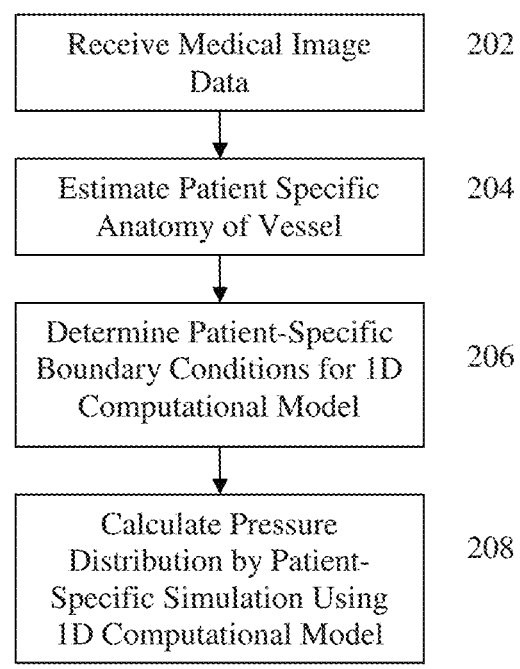
FIG. 2 illustrates a method for estimating pressure distribution in a vessel according to an embodiment of the present invention.

FIG. 2 illustrates a method for estimating pressure distribution in a vessel according to an embodiment of the present invention. As illustrated in FIG. 2, at step 202, medical image data of a patient is received. For example, the medical image data can be medical images acquired using one or more imaging modalities, such as magnetic resonance imaging (MRI), Doppler ultrasound, and computed tomography (CT). In an advantageous implementation, the medical image data can 4D phase contrast MRI (PC-MRI) data, which can be used to estimate the patient's anatomy and to show the patient's blood flow over a time period. The medical image data can be received directly from a medical imaging device, such as an MRI scanner, or can be received by loading stored medical image data of the patient.

At step 204, patient-specific anatomy of a vessel is estimated from the medical image data of the patient. The MRI images can be pre-processed using background phase correction, anti-aliasing, and motion tracking techniques, prior to estimating the patient-specific anatomy of the vessel. In an exemplary embodiment, the vessel anatomy can be estimated by generating a patient-specific anatomical model of the vessel. In order to generate the patient-specific anatomical model of the vessel, a centerline of the vessel tree can be extracted using an automated vessel centerline extraction algorithm. For example, a centerline tree of the coronary arteries can be segmented using the method described United States Published Patent Application No. 2010/0067760, which is incorporated herein by reference. Once a vessel centerline tree is extracted, cross-section contours can be generated at each point of the centerline tree. The cross-section contour at each centerline point gives a corresponding cross-section area measurement at that point in the coronary artery. A geometric surface model is then generated for the segmented coronary arteries. For example, methods for anatomical modeling of the coronary arteries are described in U.S. Pat. Nos. 7,860,290 and 7,953,266, both of which are incorporated herein by reference. In addition to the coronaries, the centerline extraction and cross-sectional contour extraction can be similarly applied on other vessels, such as the aorta, renal artery, iliac artery, etc.

Figure 3:
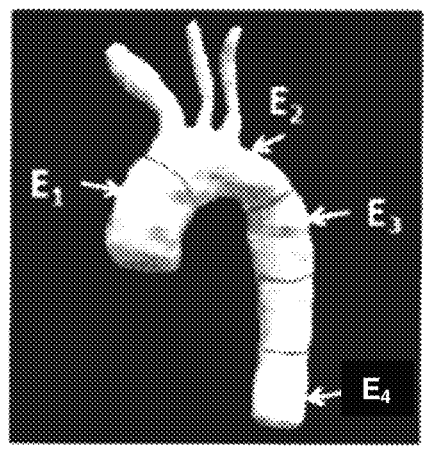
FIG. 3 illustrates dividing a vessel into multiple segments of varying wall stiffness.

At step 206, patient-specific boundary conditions for a 1D computational model representing the vessel are estimated based on the patient-specific anatomy and flow data extracted from the medical image data. As described above centerlines and cross-sectional areas of the vessels are determined in step 204. The centerline is used to determine the length of each vessel, while the cross-sectional areas are used to initialize the radii of the vessels in the 1D model and to estimate the stiffness of various vessel segments. Experimental data have shown that the stiffness of a vessel varies according to an exponential law which depends on the radius of the vessel:

$$f=k_1 \exp(k_2 \cdot r_0(x))+k_3, \quad (8)$$

where f is the parameter representing the stiffness of the vessel that is used in the state equation (Equation (3)), and $k_1$, $k_2$, and $k_3$ are parameters that for which patient-specific values are estimated based on the patient-specific anatomy extracted from the medical image data. According to an advantageous implementation, in order to obtain a better estimation of the stiffness values along the patient-specific tree, the vessels can be divided into multiple segments. For each of the segments, a fitting procedure (e.g., least squares fitting) can be applied to determine the local stiffness function based on the patient-specific anatomy and flow data. This allows wave propagation effects, which are crucial for estimation of pressures to be captured in greater detail. FIG. 3 illustrates dividing a vessel into multiple segments of varying wall stiffness. As shown in FIG. 3, the aorta is divided into four segments $E_1$, $E_2$, $E_3$, and $E_4$, and separate stiffness parameters are estimated for each segment.

Another important aspect in personalizing the 1D computational model is the determination of flow rates at the inflow and outflows in the arterial tree. For example, the flow rates can be determined from 4D PC-MRI, 2D PC-MRI, or Doppler ultrasound image data. The observed patient-specific flow rates are used to adapt the Windkessel or the structured tree boundary condition at the outflows, so that the simulated flow rates match the measured flow rates. The estimation of the vessel wall stiffness and the estimation of the outflow boundary conditions are related to each other since the wall stiffness influences the compliance of the smaller arteries through the structured tree boundary condition. Further, the time-varying flow rate measured in the medical image data at the inflow point is imposed as the inflow boundary condition.

Returning to FIG. 2, at step 208, a time varying pressure distribution is calculated along the vessel by patient-specific simulation using the 1D computational model with the patient-specific boundary conditions. At each time step, the simulation calculates a pressure and flow rate at each point along the vessel tree using the differential equations (Equations (1) and (2)) and the state equation (Equation (3)). For the numerical solution of partial differential equations, a second order method like Lax-Wendroff can be used, but this may result in spatial oscillations or numerical divergence at bifurcations or at the outflow points. Accordingly, for these two cases (bifurcations and outflow points), the method of characteristics may be used in order to reduce the numerical instabilities. Convergence tests have shown that the first order nature of the method of characteristics does not affect the second order accuracy inside the domain.

When the radius values of the vessel are determined from MR data, a relatively fine grid can be used in order to allow the model to account for changes in the cross-sectional area along the centerline of the vessels. This is in contrast to other 1D models, where constant, linearly or exponentially varying radius values have been used. The numerical scheme is applied over a certain number of cycles (each cycle including a number of time steps), or until convergence is obtained. Different convergence criteria can be applied, which are based on relative differences in pressure and flow rate values between two consecutive cycles for all grid points and time steps. The number of cycles needed to each needed to reach convergence depends on the complexity of the vessel tree and the compliance modeled through the outlet boundary conditions. Generally, vessel trees containing more vessels or higher compliance values lead to an increased number of cycles until convergence is reached.

Figure 4:
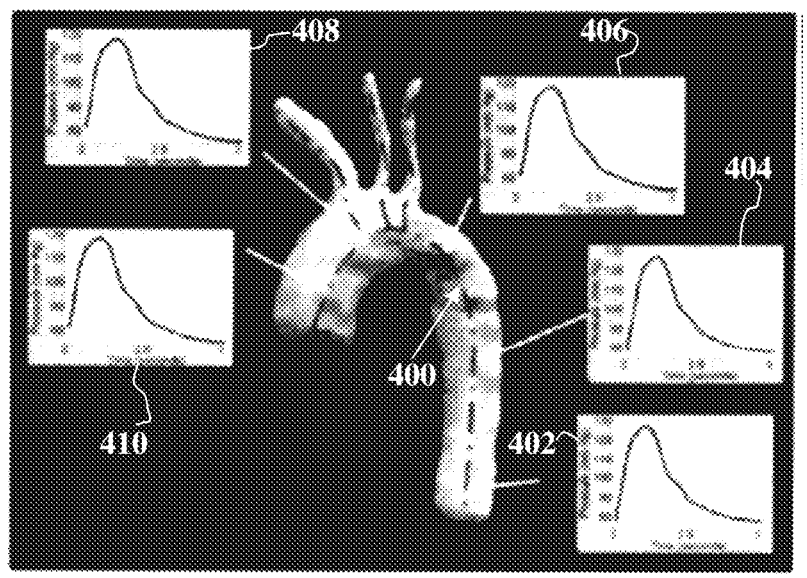
FIG. 4 illustrates exemplary pressure distributions calculated along a vessel centerline tree.

The method of FIG. 2 can be applied for both large and small arterial trees, including large, medium, or small sized arteries. Further, the method of FIG. 2 can be applied to one or more target regions of an arterial tree. Accordingly, pressures can be determined in specific target regions, such as the aortic arch, the descending aorta, the carotid bifurcations, etc. FIG. 4 illustrates exemplary pressure distributions calculated along a vessel centerline tree. As illustrated in FIG. 4, a patient-specific blood flow and pressure simulation resulted in time-varying pressure distributions 402, 404, 406, 408, and 410 calculated at corresponding points along a centerline 400 of the aorta and supra-aorta arteries.

In an advantageous embodiment of the present invention, the above described methodology is adapted for the hemodynamic assessment of aortic coarctation using patient-specific simulation based on medical image data. A patient-specific model of the aorta and supra-aortic arteries is automatically estimated from the medical image data. Based on lumen geometry of the patient, a computational fluid dynamics (CFD) pipeline employing patient-specific boundary conditions is utilized to simulate blood flow and pressure in the aorta. The simulation provides dense 3D+time velocity and pressure maps.

Figure 5:
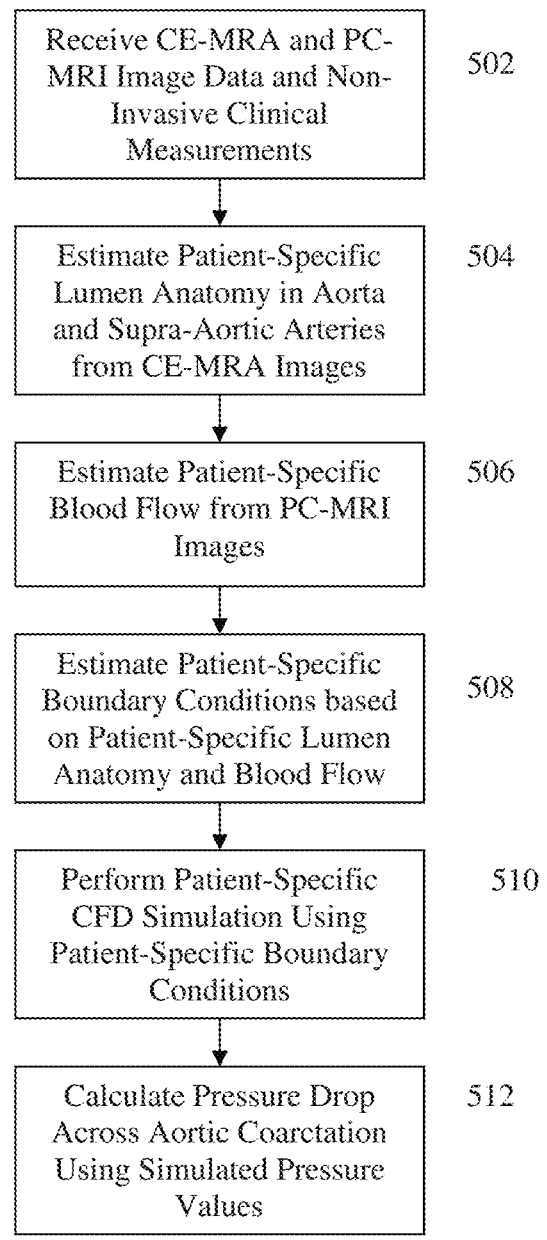
FIG. 5 illustrates a method for non-invasive hemodynamic assessment of aortic coarctation according to an embodiment of the present invention.
Figure 6:
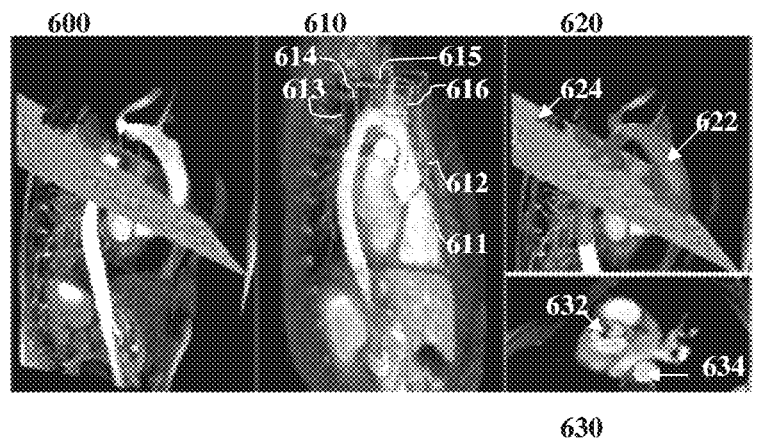
FIG. 6 illustrates exemplary results of steps of the method of FIG. 5.

FIG. 5 illustrates a method for non-invasive hemodynamic assessment of aortic coarctation according to an embodiment of the present invention. As illustrated in FIG. 5, at step 502, contrast enhanced MR angiogram (CE-MRA) image data, PC-MRI image data, and non-invasive clinical measurements of a patient are received. The non-invasive clinical measurements can include the patient's heart rate and systolic and diastolic blood pressure acquired via a blood pressure cuff. The CE-MRA images and the PC-MRI images may be received directly from an MR scanning device or may be received by loading previously stored image data of the patient. In a possible implementation, 2D PC-MRI images are received, but 4D PC-MRI images may be used as well. Although, the method of FIG. 5 is described using the examples of CE-MRA and PC-MRI image data, the present invention is not limited thereto, and the method of FIG. 5 may be similarly applied using image data acquired using various other types of imaging modalities. For example, computed tomography angiograms (CTA) can be used similarly to the CE-MRA images to extract patient-specific anatomical information and 4D PC-MRI images or Doppler ultrasound images can be used similarly to 2D PC-MRI images to extract flow information. FIG. 6 illustrates exemplary results of steps of the method of FIG. 5. Image 600 of FIG. 6 shows an overlay of a CE-MRA image and a 2D PC-MRI image.

Returning to FIG. 5, at step 504, patient-specific lumen anatomy in the aorta and supra-aortic arteries is estimated from the CE-MRA images. An accurate geometric representation of the lumen boundaries is beneficial for subsequent simulations. According to an advantageous embodiment of the present invention, a robust learning-based method is used to estimate a model of the aorta and supra-aortic arteries from the CE-MRA images. The thoracic aorta and main branches are represented as multiple parts: aortic root, aortic arch, walls of ascending aorta, walls of descending aorta, and each respective one of the supra-aortic arteries (SAoA)—braciocephalic trunk, left common carotid artery, and left subclavian artery.

First, the pose of each part is estimated following a hierarchical scheme that utilizes anatomical landmarks to constrain the machine-learning based pose estimation for each part. Each pose θ is parameterized as a similarity transformation with nine degrees of freedom (translation, orientation, and scale in a 3D Cartesian space). The estimation of the poses for the parts can be formulated as a multi-object detection problem, and the posterior probability p(θ|I) for each part can be learned from annotated training data using a probabilistic boosting tree (PBT) and Haar-like features, and then used to detect the pose in the received image data. As the aortic arch pose estimation produces the most accurate results, the proximity of the aortic arch to the SAoA can be exploited and the pose estimation for each of the SAoA can be constrained by learning the variation in their relative distances in the set of training data. Constrained by the estimated poses, each part is initialized with a corresponding mean model constructed by employing statistical shape analysis on the set of training data. A lumen detector, trained based on the training data using a PBT and Haar-like features, is used to deform the initial model for each part to the actual boundary of the lumen in the image. The final model is obtained by margining the separately estimated parts using a sequence of forward and backward projection to and from Eulerian representation to retrieve the composited Lagrangian arterial tree geometry. Referring to FIG. 6, image 610 shows bounding boxes 611, 612, 613, 614, 615, and 616 representing the poses of the parts of the vessel tree. In particular, image 610 shows bounding boxes for the aortic root 611, ascending aorta 612, aortic arch 613, and supra-aortic arteries 614, 615, and 616. Image 620 shows the segmented vessel tree 622 for the aorta and supra-aortic arteries.

Returning to FIG. 5, at step 506, patient-specific blood flow is estimated from the PC-MRI images. In order to quantify the patient's measured blood flow conditions, patient-specific blood flow profiles over the entire cardiac cycle can be extracted at the aortic inflow and outflow from velocity encoded 2D PC-MRI cine images. These sequences contain through-plane blood flow measurements in an oblique arrangement, intersecting the segmented aorta in the CE-MRA image twice: at the aortic root above the aortic valve and in a region of the descending aorta. Given a centerline of the aorta calculated from the aorta segmentation (in step 504), delineation of the lumen boundary on each PC-MRI image can be initialized using graph cuts and physiological radii constraints. The single time point segmentation is then tracked in the subsequent PC-MRI images throughout the cardiac cycle. Inside each patch defined by the delineation of the lumen boundary in the PC-MRI images, sampling of the PC-MRI images is performed at pixel centers to obtain velocity values over the entire cardiac cycle. This velocity field is integrated over the area of the segmented contour to estimate the aortic blood flow rate. The velocity field in the contour corresponding to the intersection of the 2D PC-MRI images and the segmented aorta at the aortic root gives the aortic inflow velocity, and the velocity field in the contour corresponding to the intersection of 2D PC-MRI images and the segmented aorta at the descending aorta gives the aortic outflow velocity. Referring to FIG. 6, image 620 shows the intersection of 2D PC-MRI image 624 with the segmented vessel tree 622 for the aorta and supra-aortic arteries. Image 630 shows the velocity field 632 within a contour corresponding to the segmented lumen at a first intersection of the 2D PC-MRI image 624 with the segmented vessel tree 622 and the velocity field 634 within a contour corresponding to the segmented lumen at a second intersection of the 2D PC-MRI image 624 with the segmented vessel tree 622. The velocity field 632 is used to determine the average flow rate at the ascending aorta (aortic inflow rate) and the velocity field 634 is used to determine the average flow rate at the descending aorta (aortic outflow rate).

Figure 7:
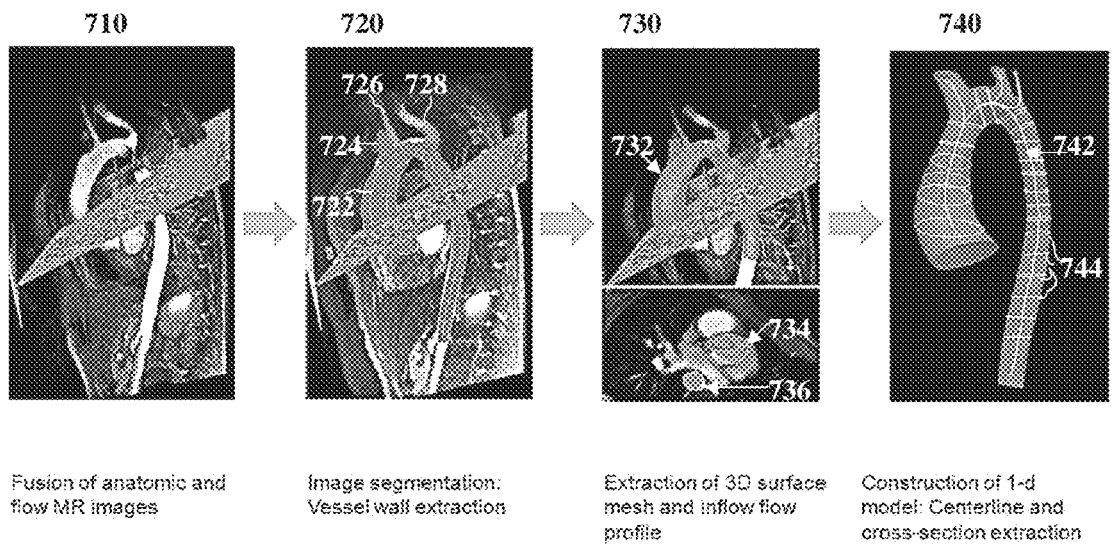
FIG. 7 illustrates a pipeline for modeling the patient-specific lumen anatomy and blood flow according to an embodiment of the present invention.

FIG. 7 illustrates a pipeline for modeling the patient-specific lumen anatomy and blood flow according to an embodiment of the present invention. The pipeline illustrated in FIG. 7 can be used to implement steps 504 and 506 of FIG. 5. As shown in FIG. 7, at 710, the anatomic (CE-MRI) and flow (2D PC-MRI) images are fused. At 720, image segmentation is performed to extract the vessel walls of the aorta 722 and supra-aortic arteries 724, 726, and 728 from the CE-MRI image data. At 730, the 3D surface mesh 732 of the aorta and supra-aortic arteries is extracted in the CE-MRI image data and the inflow flow profile and outflow flow profile are extracted by integrating the velocity profile in first and second regions 734 and 736 in each 2D PC-MRI image defined by intersections of the 2D PC-MRI image with the 3D surface mesh 732. At 740, the 1D model of the aorta and supra-aortic arteries is constructed by extracting a centerline 742 and cross-sections 744 from the 3D surface mesh 732.

Returning to FIG. 5, at step 508, patient-specific boundary conditions of a computational model of aortic hemodynamics are calculated based on the patient-specific lumen anatomy and patient-specific measured blood flow. In order to perform a patient-specific hemodynamic simulation, the inlet and outlet boundary conditions are personalized based on the non-invasive measurements for the patient's lumen anatomy and blood flow. Given, the high computational cost associated with unsteady 3D flow simulations, an axi-symmetric reduced-order model of aortic hemodynamics can be used for quick estimation of patient-specific parameters that can be subsequently used for a personalized 3D flow-simulation. The elasticity of the aortic wall can be estimated based on observed motion in the CE-MRA images by fitting an estimated deformation based on the elasticity and the observed flow data to the observed wall deformations in the CE-MRA image data.

Figure 8:
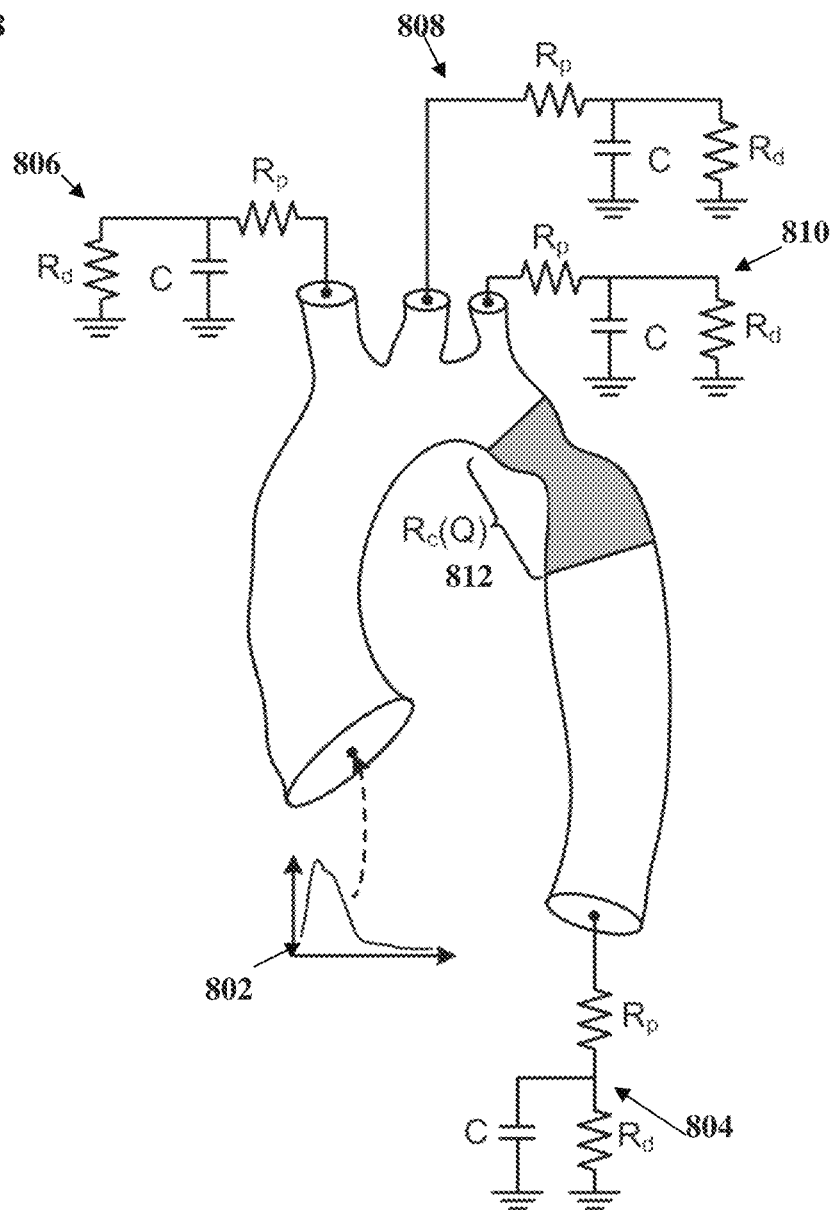
FIG. 8 illustrates an overview of the boundary conditions for the computational model of aortic hemodynamics according to an embodiment of the present invention.

The inlet boundary condition is determined by imposing the time-varying flow rate in the ascending aorta obtained from the PC-MRI data. For the outlet boundary condition, a 3-element Windkessel model can be used to specify the downstream resistance and compliance of the vessels that are not explicitly modeled in the flow computations. At each of the four outlets (brachiocephalic trunk, left common carotid artery, left subclavian artery, and descending aorta), the Windkessel model includes two resistances ($R_p$ and $R_d$) and one compliance (C). FIG. 8 illustrates an overview of the boundary conditions for the computational model of aortic hemodynamics according to an embodiment of the present invention. Referring to FIG. 8, the measured flow profile 802 specifies the inlet boundary condition at the ascending aorta. Respective Windkessel models 804, 806, 808, and 810 are used to specify the outlet boundary condition at each of the four outlets. $R_p$ is the proximal resistance, $R_d$ is the distal resistance, and C is the total compliance of the downstream circulation for each outlet. At each outflow, the total resistance $R_t$ (where $R_t = R_p + R_d$) is estimated from the mean arterial pressure (MAP) and average flow (Q) by using the relation:

$$R_t = \frac{MAP}{Q}.$$

The non-invasive estimate of Q is determined from the PC-MRI data. In order to calculate a non-invasive estimation of MAP in the ascending aorta, the systolic and diastolic cuff pressures of the patient are used together with the heart rate of the patient to calculate MAP by the relation:

$$MAP = DBP + \left[\frac{1}{3} + (HR \cdot 0.0012)\right] \cdot (SBP - DBP),$$

where DBP and SBP are the diastolic and systolic blood pressures, respectively, and HR is the heart rate.

The average flow at the ascending aorta ($Q_{asc}$) and at the descending aorta ($Q_{desc}$) are obtained from the PC-MRI data by integrating the velocity fields in the corresponding contours delineated in the PC-MRI images, as described above in step 506 of FIG. 5. The total flow in the three remaining outflow vessels (brachiocephalic trunk, left common carotid artery, and left subclavian artery) ($Q_{up}$) can be determined by: $Q_{up} = Q_{asc} - Q_{desc}$. The total flow in the first few branches, starting from the aortic root, is distributed proportionally to the square of the vessel radius, i.e., $$Q_i = \frac{Q_{up} \cdot r_i^2}{\sum_{i=1}^{3} r_i^2}$$

where $r_i$ is the vessel radius at the outflow of upper branch i. Since the pressure difference between the ascending aorta and the three upper branches is insignificant, the same average pressure can be used to estimate the total resistance at each upper outlet branch:

$$(R_t)_i = \frac{MAP}{Q_i}.$$

For the descending aorta, the assumption that MAP is the same as for the ascending aorta does not hold true, since the coarctation induces a significant pressure drop. As shown in FIG. 8, the coarctation introduces a flow-dependent resistance ($R_c(Q)$) 812 and thus, the total resistance, which represents the sum of the resistance of the coarctation and of the outflow model, is estimated as: $(R_t)_{desc} + R_c(Q) = MAP/Q_{desc}$. The resistance of the coarctation is estimated with a semi-empirical model:

$$R_c(Q) = \frac{\mu \cdot K_v}{2 \cdot \pi \cdot r_0^3} + \frac{\rho \cdot K_t}{2 \cdot A_0^2}\left(\frac{A_0}{A_s} - 1\right)^2 \cdot Q_{desc},$$

where $r_0$ is the proximal radius of the coarctation, $A_0$ and $A_s$ are the proximal and minimal cross-sectional areas of the coarctation, respectively, $\mu$ is the dynamic viscosity, $\rho$ is the blood density, and $K_v$ and $K_t$ are two constants that represent the viscous and turbulent losses of energy, respectively. $Q_{desc}$ is the measured average flow rate through the descending aorta, and $r_0$, $A_0$, and $A_s$ are determined from the patient-specific lumen anatomy estimated from the CE-MRA image data. The total resistance at the descending aorta is then calculated using the previous two equations.

After the calculation of the total resistances at each outlet to match the measured blood flow of the patient, $R_p$ and $R_d$ are calculated for each outlet. $R_p$ is equal to the characteristic resistance of the vessel (in order to minimize reflections), which is computed by the expression:

$$(R_p)_i = \frac{1}{\pi \cdot r_i^2} \sqrt{\frac{2 \cdot \rho \cdot E \cdot h}{3 \cdot r_i}},$$

where, E is the Young's modulus and h is the wall thickness of the vessel, as described in Olufsen et al., "Numerical Simulation and Experimental Validation of Blood Flow in Arteries with Structure-Tree Outflow Conditions", *Annals of Biomedical Engineering*, Vol. 28, pp. 1281-1299, 2000, which is incorporated herein by reference. $R_d$ is then calculated by $R_d = R_t - R_p$. The total compliance can be estimated, for example using the method described in Stergiopulos et al., "Total Arterial Inertance as the Fourth Element of the Windkessel Model", *Am. J. Physiol.*, H81-H88, 1999, which is incorporated herein by reference, and the individual compliances are then redistributed at each outlet. Once the windkessel parameters are estimated no further tuning is necessary to run the simulations.

Returning to FIG. 5, at step 510, patient-specific CFD simulation is performed using the patient-specific boundary conditions. In an advantageous embodiment, in order to obtain comprehensive flow information in three dimensions, full 3D Navier-Stokes equations are solved in the luminal aortic domain (estimated at step 504) using the patient-specific outflow boundary conditions for pressure (calculated at step 508). An embedded boundary method can be used for automatic embedding of a tagged stereolithography (STL) triangle mesh into a Cartesian domain. The embedding function is a signed-distance function computed using the Closest Point Transform. The computational domain cells are tagged based on their relation with the inlet triangular mesh as follows: EXTERIOR (no computation is taking place), INTERIOR (computation is taking place), INLET, OUTLET, and WALL (appropriate boundary conditions are imposed). The INLET and WALL cells are interior to the Cartesian domain, while the OUTLET cells are situated on the Cartesian domain boundaries, by extending the lumen of each vessel in its centerline direction until it reaches the Cartesian boundary.

The embedded boundary Navier-Stokes solver uses a fractional step method that computes in a first step an intermediate velocity field, using the non-linear advection-diffusion equation for velocity, and then projects the intermediate velocity onto the field of divergence free and tangent to the vessel boundary vector fields. For the velocity advection, a second-order upwind Van-Leer slope limiting method can be used, while for the diffusion force components, a semi-implicit approach can be used, which is first order accurate and unconditionally stable in 3D. The pressure projection Poisson equation can be solved using an efficient implicit multi-grid preconditioned conjugate gradient solver. The boundary conditions for the velocity can be Dirichlet in the INLET cells, no-slip (Dirichlet) in the WALL cells, and Neumann in the OUTLET cells. A variable-in-time flat inlet velocity profile can be used, and the outlet pressure boundary conditions are provided by the axi-symmetric 1D simulations described above in step 508. The blood density $\rho$ and viscosity $\mu$ can be set to literature accepted values for healthy individuals (e.g., 1.05 g/cm$^3$ and 4 mPa·s, respectively).

At step 512, the pressure drop across a coarctation region of the aorta is calculated using the simulated pressure values resulting from the CFD simulation. The CFD simulation generates simulated blood flow velocity and blood pressure for each point along the aorta at each time step. According to a possible implementation, the pressure drop can be calculated by calculating a difference in pressure before the coarctation region and pressure after the coarctation region at a time-instant when the flow rate through the descending aorta is highest.

The method of FIG. 5 can be performed on pre-operative image data of a patient in order to assess the severity of the aortic coarctation in the patient. The method of FIG. 5 can also be applied on post-operative image data of a patient after the patient undergoes a procedure (e.g., balloon angioplasty and stent implantation) to correct the aortic coarctation in order to assess the success of the procedure. When applied to post-operative image data after stent implantation, the wall-stiffness of the aorta can be modified to take into consideration the stiffness of the stent.

Figure 9:
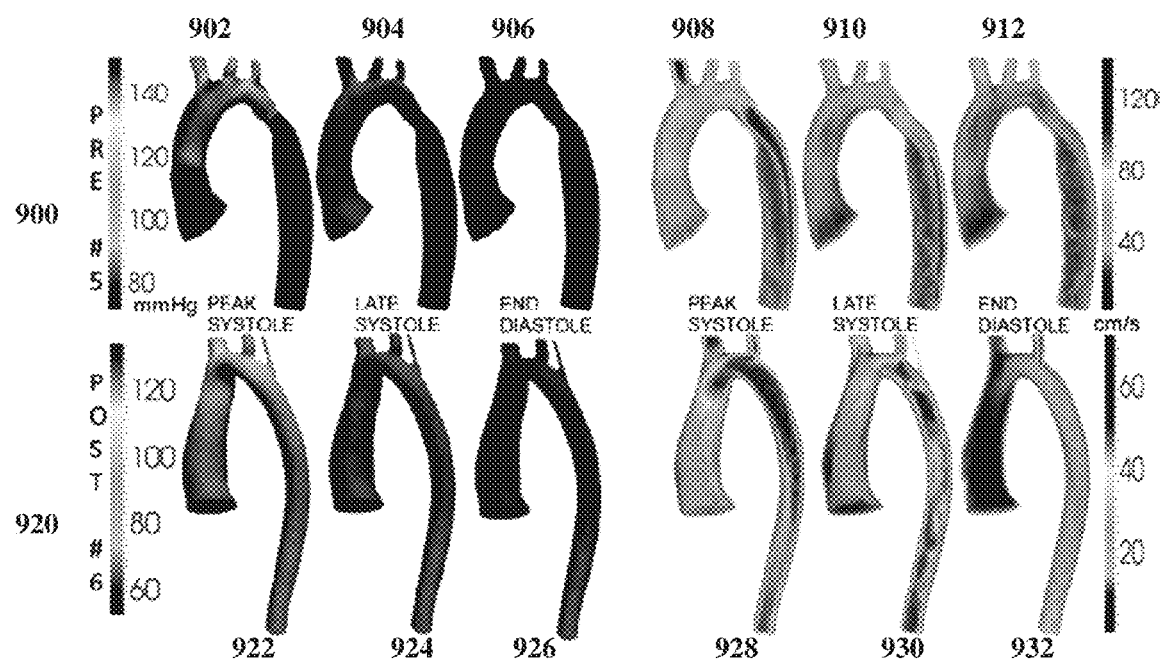
FIG. 9 illustrates exemplary aortic blood flow simulation results in pre-operative and post-operative image data.

FIG. 9 illustrates exemplary aortic blood flow simulation results in pre-operative and post-operative image data. As shown in FIG. 9, row 900 shows simulation results from pre-operative image data for a patient and row 920 shows simulation results from post-operative image data for the patient. In row 900, images 902, 904, and 906 show simulated blood pressure values mapped onto the lumen boundary at peak systole, late systole, and end diastole cardiac phases, respectively, and images 908, 910, and 912 show a volumetric visualization of the simulated blood flow velocity magnitude at peak systole, late systole, and end diastole cardiac phases, respectively. In row 920, images 922, 924, and 926 show simulated blood pressure values mapped onto the lumen boundary at peak systole, late systole, and end diastole cardiac phases, respectively, and images 928, 930, and 932 show a volumetric visualization of the simulated blood flow velocity magnitude at peak systole, late systole, and end diastole cardiac phases, respectively. As can be seen in images 902-906, there is a significant pressure gradient across the coarctation at peak systole, which gradually disappears towards the end diastole. As can be seen in images 908-912, a high velocity jet in the stenosis (coarctation) region is clearly visible. As can be seen in images 922-926, in the post-operative simulations, the pressure gradients between the ascending aorta and descending aorta and between the transverse aortic arch and the descending aorta have been partially restored to normal values. Similarly, as can be seen in images 928-932, normal flow patterns are restored in the post-operative simulations, with the highest velocity in the aortic arch and a reduced Reynolds number as compared with the pre-operative simulations.

Figure 10:
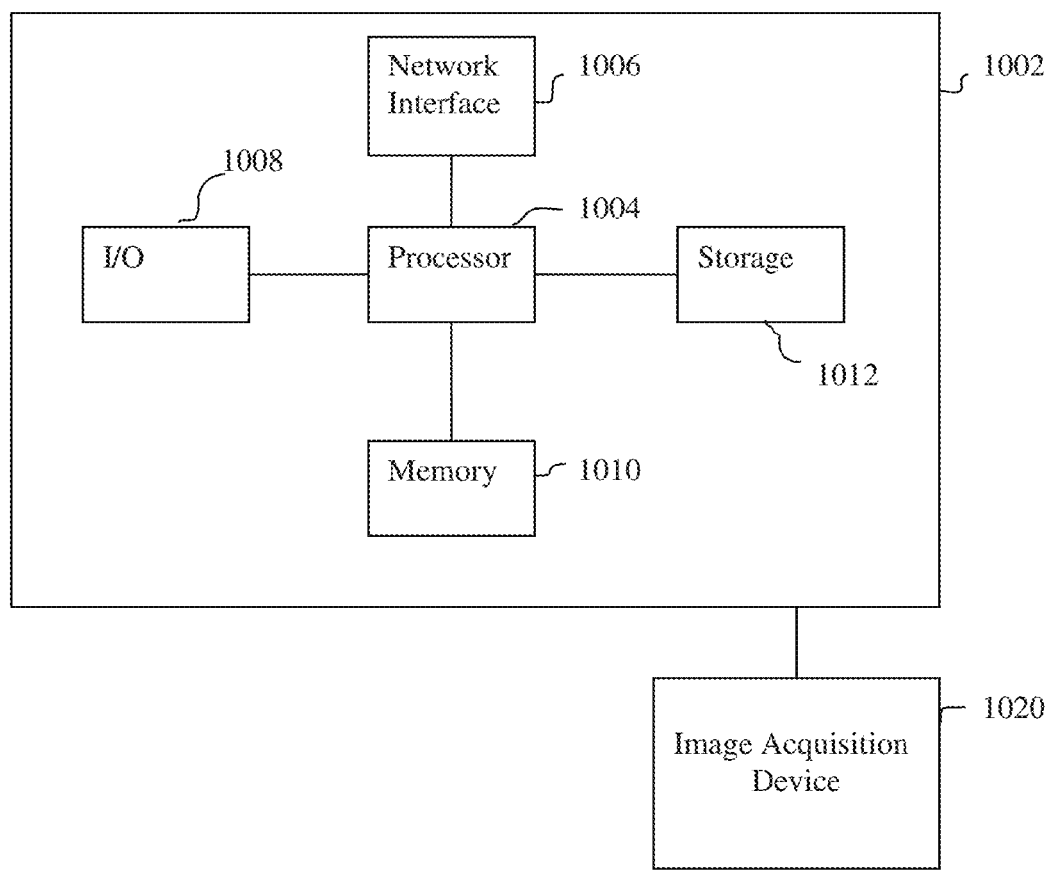
FIG. 10 is a high-level block diagram of a computer capable of implementing the present invention.

The above-described methods for estimating pressure distribution in vessels and non-invasive hemodynamic assessment of aortic coarctation may be implemented on a computer using well-known computer processors, memory units, storage devices, computer software, and other components. A high-level block diagram of such a computer is illustrated in FIG. 10. Computer 1002 contains a processor 1004, which controls the overall operation of the computer 1002 by executing computer program instructions which define such operation. The computer program instructions may be stored in a storage device 1012 (e.g., magnetic disk) and loaded into memory 1010 when execution of the computer program instructions is desired. Thus, the steps of the methods of FIGS. 2, 5, and 7 may be defined by the computer program instructions stored in the memory 1010 and/or storage 1012 and controlled by the processor 1004 executing the computer program instructions. An image acquisition device 1020, such as an MR scanning device, can be connected to the computer 1002 to input image data to the computer 1002. It is possible to implement the image acquisition device 1020 and the computer 1002 as one device. It is also possible that the image acquisition device 1020 and the computer 1002 communicate wirelessly through a network. The computer 1002 also includes one or more network interfaces 1006 for communicating with other devices via a network. The computer 1002 also includes other input/output devices 1008 that enable user interaction with the computer 1002 (e.g., display, keyboard, mouse, speakers, buttons, etc.). Such input/output devices 1008 may be used in conjunction with a set of computer programs as an annotation tool to annotate volumes received from the image acquisition device 1020. One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for non-invasive hemodynamic assessment of aortic coarctation, comprising:
    estimating patient-specific lumen anatomy of an aorta and supra-aortic arteries from medical image data of a patient;
    estimating patient-specific aortic blood flow rates from the medical image data of the patient;
    calculating patient-specific inlet and outlet boundary conditions for a computational model of aortic blood flow based on the patient-specific lumen anatomy, the patient-specific aortic blood flow rates, and non-invasive clinical measurements of the patient; and
    computing aortic blood flow and pressure over the patient-specific lumen anatomy using the computational model of aortic blood flow and the patient-specific inlet and outlet boundary conditions.

2. The method of claim 1, further comprising:
    calculating a pressure drop across a coarctation region of the aorta using computed pressure values resulting from computing the aortic blood flow and pressure.

3. The method of claim 2, wherein calculating a pressure drop across a coarctation region of the aorta using computed pressure values resulting from computing the aortic blood flow and pressure comprises:
    calculating a difference between computed pressure values before and after the coarctation region of the aorta at a time instance when a computed flow-rate in the descending aorta is highest.

4. The method of claim 1, wherein estimating patient-specific lumen anatomy of the aorta and supra-aortic arteries from medical image data of a patient comprises:
    detecting a respective pose in the medical image data for each of a plurality of parts of the aorta and supra-aortic arteries;
    initializing a respective model for each of the plurality of parts by fitting a corresponding learned mean shape model to the respective pose in the medical image data;
    deforming the respective model for each of the plurality of parts using a trained lumen detector; and
    merging the respective models for the plurality of parts to generate a final model of lumen anatomy in the aorta and supra-aortic arteries.

5. The method of claim 1, wherein estimating patient-specific lumen anatomy of the aorta and supra-aortic arteries from medical image data of a patient comprises:
    estimating the patient-specific lumen anatomy of the aorta and supra-aortic arteries in a contrast-enhanced magnetic resonance imaging (CE-MRI) image.

6. The method of claim 1, wherein estimating patient-specific aortic blood flow rates from the medical image data of the patient comprises:
    estimating patient-specific aortic blood flow rates from a sequence of velocity encoded 2D phase-contrasted magnetic resonance imaging (PC-MRI) images.

7. The method of claim 6, wherein estimating patient-specific aortic blood flow rates from a sequence of velocity encoded 2D phase-contrasted magnetic resonance imaging (PC-MRI) images comprises:
    overlaying each of the 2D PC-MRI images with the estimated lumen anatomy of the aorta and supra-aortic arteries, wherein the overlayed 2D PC-MRI intersects with the estimated lumen anatomy at a first intersection corresponding to an ascending aorta and a second intersection corresponding to a descending aorta;
    detecting a first contour representing the estimated lumen anatomy at the first intersection and a second contour representing the estimated lumen anatomy at the second intersection in each 2D PC-MRI image;
    calculating a time-varying flow rate at the ascending aorta by integrating velocity values over an area of the first contour for each of the 2D PC-MRI images; and
    calculating a time-varying flow rate at the descending aorta by integrating velocity values over an area of the second contour for each of the 2D PC-MRI images.

8. The method of claim 1, wherein calculating patient-specific inlet and outlet boundary conditions for a computational model of aortic blood flow based on the patient-specific lumen anatomy, the patient-specific aortic blood flow rates, and non-invasive clinical measurements of the patient comprises:
    imposing a time-varying blood flow rate estimated at the ascending aorta as the inlet boundary condition; and
    estimating patient-specific parameters of a 3-element Windkessel model at each of four outlets corresponding to a brachiocephalic trunk, left common carotid artery, left subclavian artery, and descending aorta based on the patient-specific lumen anatomy, the patient-specific aortic blood flow rates, and the non-invasive clinical measurements of the patient.

9. The method of claim 8, wherein estimating patient-specific parameters of a 3-element Windkessel model at each of four outlets corresponding to a brachiocephalic trunk, left common carotid artery, left subclavian artery, and descending aorta based on the patient-specific lumen anatomy, the patient-specific aortic blood flow rates, and the non-invasive clinical measurements of the patient comprises:
    calculating mean arterial pressure (MAP) based on diastolic and systolic blood pressures of the patient and a heart rate of the patient;
    calculating a total resistance for each outlet based on an average flow at the outlet and the MAP; and calculating proximal and distal resistances for each outlet based on the total resistance calculated for each outlet.

10. The method of claim 9, wherein calculating a total resistance for each outlet based on an average flow at the outlet and the MAP comprises:
calculating a total flow remaining in the brachiocephalic trunk, left common carotid artery, and left subclavian artery as $Q_{up}=Q_{asc}-Q_{desc}$, where $Q_{asc}$ is an average flow at the ascending aorta and $Q_{desc}$ is an average flow at the descending aorta;
for each of the brachiocephalic trunk, left common carotid artery, and left subclavian artery, calculating the average flow at that outlet as $$Q_i = \frac{Q_{up} \cdot r_i^2}{\sum_{i=1}^{3} r_i^2},$$

where $r_i$ is the vessel radius at the outflow of upper branch i; and
for each of the brachiocephalic trunk, left common carotid artery, left subclavian artery, calculating the total resistance as:

$$(R_t)_i = \frac{MAP}{Q_i}.$$

11. The method of claim 10, wherein calculating a total resistance for each outlet based on an average flow at the outlet and the MAP comprises further comprises:
calculating the total resistance for the descending aorta outlet $(R_t)_{desc}$ using the equation: $(R_t)_{desc}+R_s(Q)=MAP/Q_{desc}$, where $R_S(Q)$ is a flow-dependent resistance of a coarctation region that is estimated with a semi-empirical model:

$$R_s(Q) = \frac{\mu \cdot K_v}{2 \cdot \pi \cdot r_0^3} + \frac{\rho \cdot K_t}{2 \cdot A_0^2}\left(\frac{A_0}{A_s} - 1\right)^2 \cdot Q_{desc},$$

where $r_0$ is the proximal radius of the coarctation region, $A_0$ and $A_s$ are proximal and minimal cross-sectional areas of the coarctation region, respectively, $\mu$ is a dynamic viscosity, $\rho$ is blood density, and $K_v$ and $K_t$ are two constants that represent the viscous and turbulent losses of energy, respectively.

12. The method of claim 9, wherein calculating proximal and distal resistances for each outlet based on the total resistance calculated for each outlet comprises:
calculating the proximal resistance for each outlet as a characteristic resistance of that vessel; and
calculating the distal resistance for each outlet as a difference between the total resistance for that outlet and the proximal resistance for that outlet.

13. The method of claim 1, wherein simulating aortic blood flow and pressure over the patient-specific lumen anatomy using the computational model of aortic blood flow and the patient-specific inlet and outlet boundary conditions comprises:
simulating aortic blood flow using a 3D computational fluid dynamics (CFD) simulation.

14. An apparatus for non-invasive hemodynamic assessment of aortic coarctation, comprising:
means for estimating patient-specific lumen anatomy of an aorta and supra-aortic arteries from medical image data of a patient;
means for estimating patient-specific aortic blood flow rates from the medical image data of the patient;
means for calculating patient-specific inlet and outlet boundary conditions for a computational model of aortic blood flow based on the patient-specific lumen anatomy, the patient-specific aortic blood flow rates, and non-invasive clinical measurements of the patient; and
means for computing aortic blood flow and pressure over the patient-specific lumen anatomy using the computational model of aortic blood flow and the patient-specific inlet and outlet boundary conditions.

15. The apparatus of claim 14, further comprising:
means for calculating a pressure drop across a coarctation region of the aorta using computed pressure values resulting from computing the aortic blood flow and pressure.

16. The apparatus of claim 14, wherein the means for estimating patient-specific aortic blood flow rates from the medical image data of the patient comprises:
means for estimating patient-specific aortic blood flow rates from a sequence of velocity encoded 2D phase-contrasted magnetic resonance imaging (PC-MRI) images.

17. The apparatus of claim 14, wherein the means for calculating patient-specific inlet and outlet boundary conditions for a computational model of aortic blood flow based on the patient-specific lumen anatomy, the patient-specific aortic blood flow rates, and non-invasive clinical measurements of the patient comprises:
means for imposing a time-varying blood flow rate estimated at the ascending aorta as the inlet boundary condition; and
means for estimating patient-specific parameters of a 3-element Windkessel model at each of four outlets corresponding to a brachiocephalic trunk, left common carotid artery, left subclavian artery, and descending aorta based on the patient-specific lumen anatomy, the patient-specific aortic blood flow rates, and the non-invasive clinical measurements of the patient.

18. The apparatus of claim 17, wherein the means for estimating patient-specific parameters of a 3-element Windkessel model at each of four outlets corresponding to a brachiocephalic trunk, left common carotid artery, left subclavian artery, and descending aorta based on the patient-specific lumen anatomy, the patient-specific aortic blood flow rates, and the non-invasive clinical measurements of the patient comprises:
means for calculating mean arterial pressure (MAP) based on diastolic and systolic blood pressures of the patient and a heart rate of the patient;
means for calculating a total resistance for each outlet based on an average flow at the outlet and the MAP; and
means for calculating proximal and distal resistances for each outlet based on the total resistance calculated for each outlet.

19. The apparatus of claim 1, wherein the means for simulating aortic blood flow and pressure over the patient-specific lumen anatomy using the computational model of aortic blood flow and the patient-specific inlet and outlet boundary conditions comprises:
means for simulating aortic blood flow using a 3D computational fluid dynamics (CFD) simulation.

20. A non-transitory computer readable medium storing computer program instructions for non-invasive hemodynamic assessment of aortic coarctation, the computer program instructions when executed by a processor cause the processor to perform operations comprising:

estimating patient-specific lumen anatomy of an aorta and supra-aortic arteries from medical image data of a patient;

estimating patient-specific aortic blood flow rates from the medical image data of the patient;

calculating patient-specific inlet and outlet boundary conditions for a computational model of aortic blood flow based on the patient-specific lumen anatomy, the patient-specific aortic blood flow rates, and non-invasive clinical measurements of the patient; and computing aortic blood flow and pressure over the patient-specific lumen anatomy using the computational model of aortic blood flow and the patient-specific inlet and outlet boundary conditions.

21. The non-transitory computer readable medium of claim 20, wherein the operations further comprise:

calculating a pressure drop across a coarctation region of the aorta using computed pressure values resulting from computing the aortic blood flow and pressure.

22. The non-transitory computer readable medium of claim 20, wherein estimating patient-specific lumen anatomy of the aorta and supra-aortic arteries from medical image data of a patient comprises:

detecting a respective pose in the medical image data for each of a plurality of parts of the aorta and supra-aortic arteries;

initializing a respective model for each of the plurality of parts by fitting a corresponding learned mean shape model to the respective pose in the medical image data;

deforming the respective model for each of the plurality of parts using a trained lumen detector; and merging the respective models for the plurality of parts to generate a final model of lumen anatomy in the aorta and supra-aortic arteries.

23. The non-transitory computer readable medium of claim 20, wherein estimating patient-specific aortic blood flow rates from the medical image data of the patient comprises:

estimating patient-specific aortic blood flow rates from a sequence of velocity encoded 2D phase-contrasted magnetic resonance imaging (PC-MRI) images.

24. The non-transitory computer readable medium of claim 23, wherein estimating patient-specific aortic blood flow rates from a sequence of velocity encoded 2D phase-contrasted magnetic resonance imaging (PC-MRI) images comprises:

overlaying each of the 2D PC-MRI images with the estimated lumen anatomy of the aorta and supra-aortic arteries, wherein the overlayed 2D PC-MRI intersects with the estimated lumen anatomy at a first intersection corresponding to an ascending aorta and a second intersection corresponding to a descending aorta;

detecting a first contour representing the estimated lumen anatomy at the first intersection and a second contour representing the estimated lumen anatomy at the second intersection in each 2D PC-MRI image;

calculating a time-varying flow rate at the ascending aorta by integrating velocity values over an area of the first contour for each of the 2D PC-MRI images; and calculating a time-varying flow rate at the descending aorta by integrating velocity values over an area of the second contour for each of the 2D PC-MRI images.

25. The non-transitory computer readable medium of claim 20, wherein calculating patient-specific inlet and outlet boundary conditions for a computational model of aortic blood flow based on the patient-specific lumen anatomy, the patient-specific aortic blood flow rates, and non-invasive clinical measurements of the patient comprises:

imposing a time-varying blood flow rate estimated at the ascending aorta as the inlet boundary condition; and estimating patient-specific parameters of a 3-element Windkessel model at each of four outlets corresponding to a brachiocephalic trunk, left common carotid artery, left subclavian artery, and descending aorta based on the patient-specific lumen anatomy, the patient-specific aortic blood flow rates, and the non-invasive clinical measurements of the patient.

26. The non-transitory computer readable medium of claim 25, wherein estimating patient-specific parameters of a 3-element Windkessel model at each of four outlets corresponding to a brachiocephalic trunk, left common carotid artery, left subclavian artery, and descending aorta based on the patient-specific lumen anatomy, the patient-specific aortic blood flow rates, and the non-invasive clinical measurements of the patient comprises:

calculating mean arterial pressure (MAP) based on diastolic and systolic blood pressures of the patient and a heart rate of the patient;

calculating a total resistance for each outlet based on an average flow at the outlet and the MAP; and calculating proximal and distal resistances for each outlet based on the total resistance calculated for each outlet.

27. The non-transitory computer readable medium of claim 26, wherein calculating a total resistance for each outlet based on an average flow at the outlet and the MAP comprises:

calculating a total flow remaining in the brachiocephalic trunk, left common carotid artery, and left subclavian artery as $Q_{up} = Q_{asc} - Q_{desc}$, where $Q_{asc}$ is an average flow at the ascending aorta and $Q_{desc}$ is an average flow at the descending aorta;

for each of the brachiocephalic trunk, left common carotid artery, and left subclavian artery, calculating the average flow at that outlet as $$Q_i = \frac{Q_{up} \cdot r_i^2}{\sum_{i=1}^{3} r_i^2},$$

where $r_i$ is the vessel radius at the outflow of upper branch i; and for each of the brachiocephalic trunk, left common carotid artery, left subclavian artery, calculating the total resistance as:

$$(R_t)_i = \frac{MAP}{Q_i}.$$

28. The non-transitory computer readable medium of claim 27, wherein calculating a total resistance for each outlet based on an average flow at the outlet and the MAP comprises further comprises:

calculating the total resistance for the descending aorta outlet $(R_t)_{desc}$ using the equation: $(R_t)_{desc} + R_s(Q) = MAP/Q_{desc}$, where $R_s(Q)$ is a flow-dependent resistance of a coarctation region that is estimated with a semi-empirical model:

$$R_s(Q) = \frac{\mu \cdot K_v}{2 \cdot \pi \cdot r_0^3} + \frac{\rho \cdot K_t}{2 \cdot A_0^2}\left(\frac{A_0}{A_s} - 1\right)^2 \cdot Q_{desc},$$

where $r_0$ is the proximal radius of the coarctation region, $A_0$ and $A_s$ are proximal and minimal cross-sectional areas of the coarctation region, respectively, $\mu$ is a dynamic viscosity, $\rho$ is blood density, and $K_v$ and $K_t$ are two constants that represent the viscous and turbulent losses of energy, respectively.

29. The non-transitory computer readable medium of claim 20, wherein simulating aortic blood flow and pressure over the patient-specific lumen anatomy using the computational model of aortic blood flow and the patient-specific inlet and outlet boundary conditions comprises:

simulating aortic blood flow using a 3D computational fluid dynamics (CFD) simulation.

\* \* \* \* \*